(12) United States Patent
Rappaport

(10) Patent No.: US 6,739,606 B2
(45) Date of Patent: May 25, 2004

(54) DUAL-FOOTBOARD SCOOTER

(75) Inventor: Mark Rappaport, Carlsbad, CA (US)

(73) Assignee: Marky Sparky, Inc., Carlsbad, CA (US)

( * ) Notice: Subject to any disclaimer, the term of this patent is extended or adjusted under 35 U.S.C. 154(b) by 21 days.

(21) Appl. No.: 10/067,114

(22) Filed: Feb. 4, 2002

(65) Prior Publication Data

US 2002/0070519 A1 Jun. 13, 2002

Related U.S. Application Data

(63) Continuation-in-part of application No. 09/075,746, filed on May 11, 1998, now Pat. No. 6,378,879, which is a continuation-in-part of application No. 08/593,437, filed on Jan. 29, 1996, now Pat. No. 5,785,331.

(51) Int. Cl.$^7$ ............................................... B62M 1/00
(52) U.S. Cl. ............................................... 280/87.041
(58) Field of Search .................. 280/87.01, 87.021, 280/87.03, 87.041, 87.042, 11.2, 14.3, 12.1, 7.12, 7.13, 7.14; 301/5.3; 441/65, 68, 72, 79

(56) References Cited

U.S. PATENT DOCUMENTS

| | | | |
|---|---|---|---|
| 899,963 A | 9/1908 | Ferguson | |
| 982,846 A | 1/1911 | Nesbitt, Sr. | |
| 1,308,526 A | * 7/1919 | McLaren | 280/87.021 |
| 1,472,375 A | 10/1923 | Stuart et al. | |
| 1,516,105 A | 11/1924 | Kinoshita | |
| 1,530,165 A | 3/1925 | Fowler | |
| 1,617,357 A | 2/1927 | Walter | |
| 1,678,836 A | 7/1928 | Wessborg | |
| 2,011,402 A | * 8/1935 | Gallo | 280/87.021 |
| 2,077,274 A | 4/1937 | Silkman | |
| 2,597,748 A | 5/1952 | Powell | |
| 4,047,732 A | 9/1977 | Williams et al. | |
| 4,071,261 A | 1/1978 | Winchell | |
| 4,087,104 A | 5/1978 | Winchell et al. | |
| 4,087,106 A | 5/1978 | Winchell | |
| 4,123,079 A | 10/1978 | Biskup | |
| 4,143,728 A | 3/1979 | Shiber | |
| 4,375,294 A | * 3/1983 | Beauchamp | 280/87.021 |
| 4,540,192 A | 9/1985 | Shelton | |
| 4,552,372 A | 11/1985 | Jones | |
| D291,211 S | 8/1987 | Man | |
| 4,776,604 A | 10/1988 | Valdez et al. | |
| 4,796,909 A | * 1/1989 | Kirkendall | 280/87.01 |
| 4,951,958 A | * 8/1990 | Chao | 280/87.041 |
| 5,013,032 A | 5/1991 | Baum et al. | |
| 5,039,121 A | 8/1991 | Holter | |
| 5,048,632 A | 9/1991 | Battel | |
| 5,167,597 A | * 12/1992 | David | 280/87.021 |
| 5,346,231 A | 9/1994 | Ho | |
| 5,620,189 A | 4/1997 | Hinderhofer | |
| 5,645,291 A | 7/1997 | Ramage | |

FOREIGN PATENT DOCUMENTS

| | | | |
|---|---|---|---|
| AU | 0047723 | 5/1911 | |
| DE | 910298 | 4/1954 | |
| FR | 2689082 | * 10/1993 | B62K/5/02 |
| GB | 0003277 | 10/1909 | |
| SE | 126364 | 10/1949 | |

* cited by examiner

*Primary Examiner*—Frank Vanaman
(74) *Attorney, Agent, or Firm*—Dilworth & Barrese, LLP

(57) ABSTRACT

A dual-footboard scooter in a tricycle format having a front wheel or ski coupled to a steering post passing through a steering column to join a steering handle and a bifurcated frame extending rearwardly from the steering column forms two branches, extensions of which each support a rear wheel or ski, respectively. In operating the scooter, the rider grasps the steering handle, rests one foot on either footboard and swings the other foot extending through the extended free space between the footboards and bifurcated frame, making pushing contact with the ground or snow to propel the scooter.

18 Claims, 4 Drawing Sheets

DUAL-FOOTBOARD SCOOTER

RELATED APPLICATIONS

This application is a continuation-in-part of and claims priority from my copending application Ser. No. 09/075,746, filed May 11, 1998, now U.S. Pat. No. 6,378,879 which is a continuation-in-part of and claims priority from my then copending application Ser. No. 08/593,437, filed Jan. 29, 1996, which issued as U.S. Pat. No. 5,785,331, the entire disclosure of which are incorporated herein by reference.

BACKGROUND OF THE INVENTION

1. Field of Invention

This invention relates generally to foot-propelled scooters and ride-on devices, particularly to a dual-footboard scooters and devices in a tricycle format.

2. Description of the Related Art

A standard scooter is a child's vehicle which includes a long footboard supported by front and rear end wheels. The scooter is controlled by an upright steering post coupled to the front wheel and provided with a steering handle. In riding the scooter, the child grasps the handle and rests one foot on the footboard. The child puts the scooter in motion by means of his other foot, which is swung to repeatedly make pushing contact with the road on one side of the footboard.

A single footboard scooter is a somewhat hazardous vehicle in the hands of an inexperienced rider, for like a two-wheel bicycle, the scooter is inherently unstable. When the scooter is in motion the rider's weight is balanced on the footboard, otherwise, the scooter will tip to one side, throwing the rider. If the scooter should jump in the course of travel and the front wheel becomes raised above the ground, the scooter may then swing backward about the rear wheel, throwing the rider.

Far more stable and controllable than a scooter is a conventional tricycle, which has a front wheel to which a steering handle is coupled through a steering post, and a pair of rear wheels above which is a seat to accommodate the rider. The feet of the seated rider engages pedals mounted on the axle of the front wheel.

A tricycle, however, is a relatively tame vehicle, for its pedal operation precludes the tricycle from traveling very fast. The advantage of a scooter is that it cannot only be propelled to travel at high speed, but the rider can also execute various maneuvers or tricks with a scooter, such as jumping over steps to go from a raised to a lower road surface. However, performing tricks on a conventional single footboard scooter frequently entails unacceptable risk.

Inasmuch as a scooter in accordance with the invention is in a tricycle format, Powell (U.S. Pat. No. 2,597,748) discloses a walking and riding vehicle provided with a bifurcated or V-shaped tubular metal frame on whose diverging legs are mounted rear end wheels. A front wheel controlled by a steering handle is supported below the apex of the frame. The child grasping the handle can walk the Powell vehicle by walking between the legs, or the vehicle can be used for coasting by standing on foot rest plates attached to the diverging legs.

The tri-skater is disclosed by Holter in U.S. Pat. No. 5,039,121 with a v-shaped frame on which footboards are mounted, and rear skate casters coupled to the rear of its footboards. A handle-controlled front wheel is coupled to the apex of the frame. The Holter vehicle is propelled by a rider performing a cambering motion, similar to an ice skater, grasping the handle simultaneously standing on both of the footboards, and shifting his or her weight alternately from side to side.

The three-wheeled scooter type vehicle disclosed in the Shelton patent, U.S. Pat. No. 4,540,192, is forwardly propelled by body movement of the rider by means of two rearwardly extending foot support frames pivotally connected to a front steering column. The foot support frames are provided with caster wheels which are yieldably tensioned to propel the vehicle in a direction of forward travel when the foot support frames are laterally moved, also akin to the cambering motion of an ice skater.

Disclosed in the Winchell U.S. Pat. Nos. 4,071,261, 4,076,270 and 4,088,338, in the Biskup U.S. Pat. No. 4,165,093 and in the Williams U.S. Pat. No. 4,047,732 are three-wheeled cambering vehicles. In these cambering vehicles, foot rests are also provided in a bifurcated or V-formation, the vehicle being propelled by the rider shifting his weight in a timed sequence from one foot to the other.

My above-identified applications disclose standard and off-road dual-footboard scooters and related ride-on devices, all in a tricycle format and most with a front wheel mounted under a steering post that passes through a steering column and joins a steering handle that is provided with a hand brake operatively coupled to the front wheel. Footboards are attached at each of their front ends to the rearward extensions of the bifurcated frame, from the steering column. Secured to the underside of each footboard is a rear end wheel, behind which is a skid brake adapted to engage the ground when the footboard is upwardly tilted.

The bifurcated frame defines separate bifurcated branch members, to which rearwardly extending branch members attach, the bifurcated branch members having a first free space therebetween which merges with a second free space between the rearwardly extending branch members, forming in their uninterrupted part an extended free space. This volume of extended free space allows, regardless of where a rider stands with one foot on either footboard, the rider to swing his or her propelling foot in an unimpeded fashion, as necessary to propel the scooter, which is especially useful to propel the scooter at high rates of speed. The third dimension of the volume of the first free space is generally defined by the lower part of the sloping bifurcated branch members up to the top-most portion of the steering column. The third dimension of the volume of the second free space is similarly generally defined at a height of below the top-most portion of the steering column to the bottom-most portion of the rear wheels, or more specifically, the volume through which the rider will thrust his or her propelling foot during the high speed travel that the scooter is designed for, as further described below.

In operating the scooter, the rider grasps the steering handle, one foot then resting on either footboard, the other foot extending (or swinging) through the extended free space making pushing contact with the ground and propelling the scooter forward.

A scooter of the type disclosed in my above-referenced applications are suited for use on smooth paved roads that are free of ruts and other surface disruptions, as well as for off-road operations.

Scooters previously known in the art prior to my above-referenced applications would swing backward about the rear wheels and throw or otherwise endanger the rider when, during the course of travel, their footboards become upwardly inclined. The scooters of my inventions avoid this action by the rear skid brakes which then engage the ground to cause the scooter to swing forward to return the front wheel to the ground, as well as providing other benefits described herein. The scooters of my invention further allow for quick disassembly and assembly, which is especially useful for transport of the scooter in another vehicle.

SUMMARY OF THE INVENTION

In view of the foregoing, an object of this invention is to provide a dual-footboard scooter in a tricycle format which is propelled by a rider who rests one foot on either rearwardly extending branch member and swing the other foot through an extended free space to make pushing contact with the ground.

An advantage and significant feature of a dual-footboard scooter in accordance with the invention include that the scooter has the inherent stability of a tricycle, yet is more maneuverable and is capable of being propelled to travel at a much faster speed; the scooter is safe to operate under both standard or off-road conditions, with wheels having standard or deep-tread tires, if necessary to provide good traction on a dirt path or an unpaved road; the scooter is of simple design and can therefore be mass produced at low cost, using for this purpose standard tricycle components; and, the rearwardly extending branch members are removable to facilitate compact transport, and the rider can selectively position the rear wheels.

The front and rear wheels may either be relatively smooth or may be provided with deep-tread tires for improved traction on unpaved surfaces. In operating the scooter, the rider grasps the steering handle, with ne foot then resting on either footboard and the other foot extending through the free space between the footboards and swinging to make pushing contact with the ground to propel the scooter.

BRIEF DESCRIPTION OF THE DRAWINGS

For a better understanding of the invention as well as other objects and further features thereof, reference is made to the following detailed description to be read in conjunction with the accompanying drawings, wherein.

DETAILED DESCRIPTION OF THE PREFERRED EMBODIMENT(S)

The following detailed description of a preferred embodiment of the invention will be made in reference to the accompanying drawings. In describing the invention, explanation about related functions or constructions which are known to the art will be omitted for the sake of clearness in understanding the concept of the invention, as such would obscure the invention with unnecessary detail.

Figure 1:
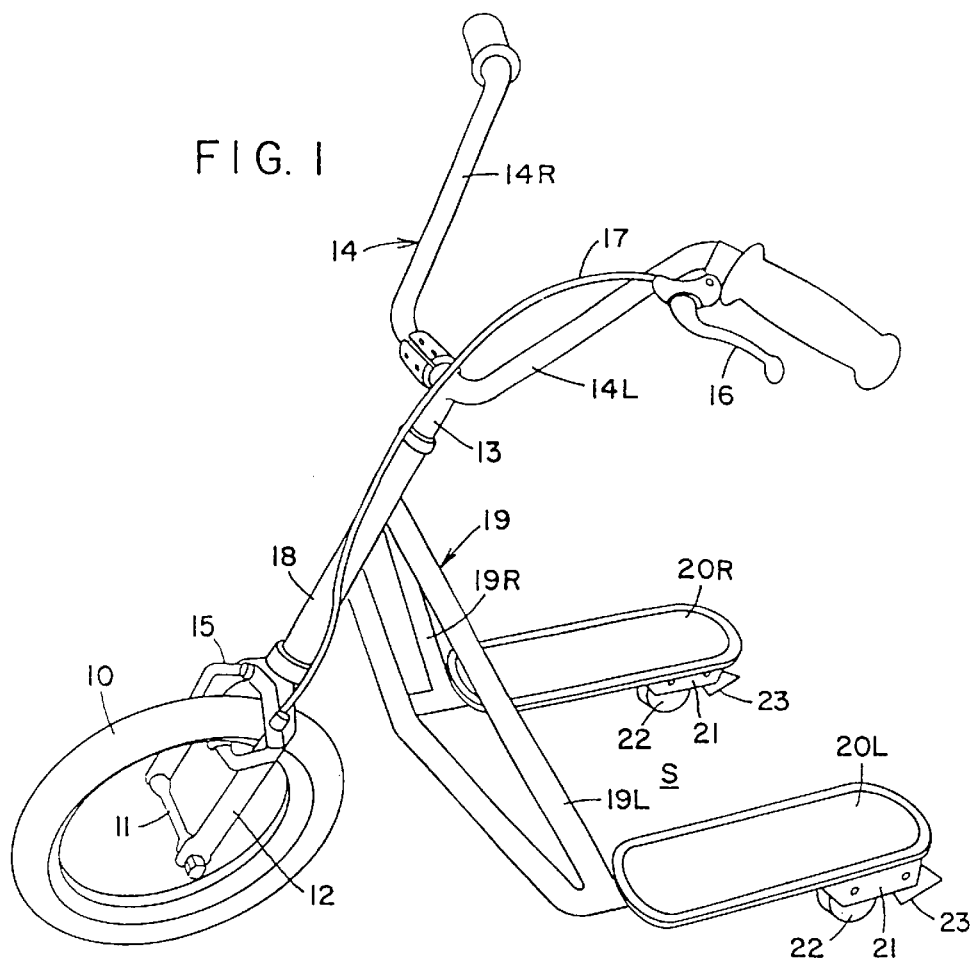
FIG. 1 is a perspective view of a dual-footboard scooter for road use in accordance with the invention.

Referring now to FIG. 1, there is shown a dual-footboard scooter in a tricycle format in accordance with the invention for road use, the scooter including a front wheel (10). Wheel (10) may be a conventional 10 to 26 inch tire-rimmed wheel, mounted on an axle (11).

Coupled to axle (11) of front wheel (10) by a fork (12) is an upright steering post (13) whose upper end is joined to a steering handle (14) provided with right and left handle bars (14R) and (14L). The rim of front wheel (10) may be engageable by a clamp-type brake (15) which is controllable by a hand lever (16) mounted on the left hand bar (14L) of the handle. Lever (16) is operatively coupled to brake (15) by a cable (17). Steering post (13) extends through a steering column (18), the post being rotatable within the column. The front wheel, the steering post, the steering column and the front wheel brake may be the same as those included in a standard tricycle and are therefore readily available.

Figure 2:
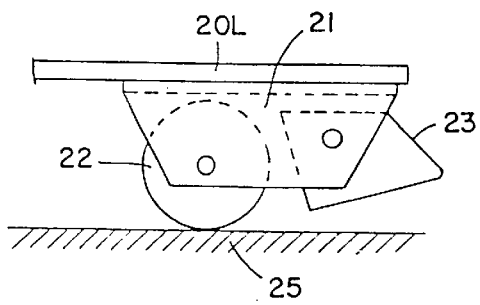
FIG. 2 shows the rear portion of one of the footboards on which is mounted a rear skate wheel and a skid brake.

Fixably attached to steering column (18) and extending rearwardly therefrom is a bifurcated rigid frame having right and left bifurcated branch members (19R) and (19L). Attached to branch (19R) is the front end of its rearwardly extending branch member (not shown in FIG. 1) an elongated right footboard (20R), and attached to branch 19L is the front end of its rearwardly extending branch member, atop of which is a left footboard (20L). Secured to the underside of each rearwardly extending branch member, as best seen in FIG. 2, is a bearing bracket (21) which supports a skate wheel (22). Wheel (22) is preferably of the type used in roller skates, the wheel being molded of high strength polyurethane or other synthetic plastic material.

Figure 3:
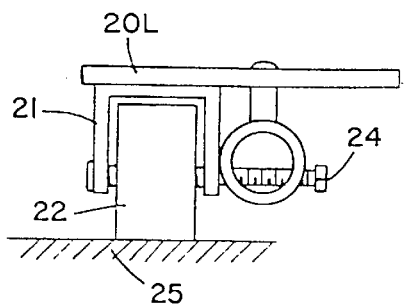
FIG. 3 illustrates the mounting for rear skate wheel.
Figure 3B:
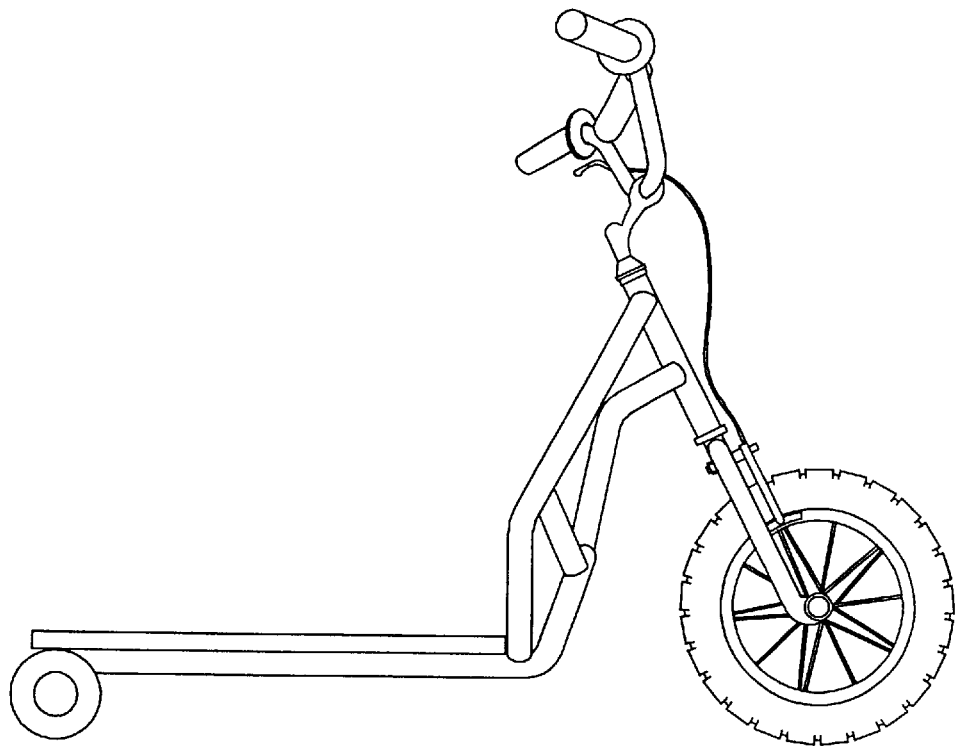
FIG. 3b shows an alternative positioning of one of the rear wheels.

As best seen in FIG. 3, skate wheel (22) is mounted on a retractable axle (24) so that when the wheel is worn or damaged, it may then readily be replaced by a fresh wheel.

An embodiment of the invention includes a skid brake (23) mounted on bracket (21) behind wheel (22). Skid brake (23) is preferably of the type found in in-Line roller skates formed of rubber or a synthetic plastic material such as polyethylene have a high coefficient of sliding friction. Alternatively, rear wheel (22) is positioned at the far end of its associated rearwardly extending branch member. A further alternative embodiment (not shown) allows for slidable positioning of rear wheel (22), and its bracket (21) along the length of the rearwardly extending branch member.

The two rearwardly extending branch members are spaced at a distance that defines a second free space (S) therebetween. Thus when a rider has one foot on either footboard he may then extend his other foot through a first free space that exists between the bifurcated branch members (19R and 19L) and, in an unimpeded fashion, into second free space (S) to swing and engage the ground with a pushing motion to propel the scooter forward.

Further to the introduction provided above, to operate the dual-footboard scooter, the rider, when the scooter is coasting, grasps the handle with both hands and rests his right and left feet on footboards (20R and 20L). As the rider coasts he can steer by turning the front wheel.

In order to propel the scooter in the forward direction, the rider, while resting one foot on either footboard, swings his other foot to make pushing contact with the road surface, this foot going through a first free space between the bifurcated branch members and into the second free space, free space (S) between the footboards. Should the rider wish to slow down and arrest forward motion of the scooter, he has only to operate the hand controlled front wheel brake for this purpose. Because of the catamaran structure of the dual-footboard scooter, it is highly stable and will not tip to one side. Hence the scooter affords a measure of safety in this regard, even to an altogether inexperienced rider.

In normal operation of one embodiment, skid brakes (23) on the rear end of both footboards are raised above the road surface 25 as shown in FIG. 2, just as they would be in conventional in-line roller skates.

Figure 4:
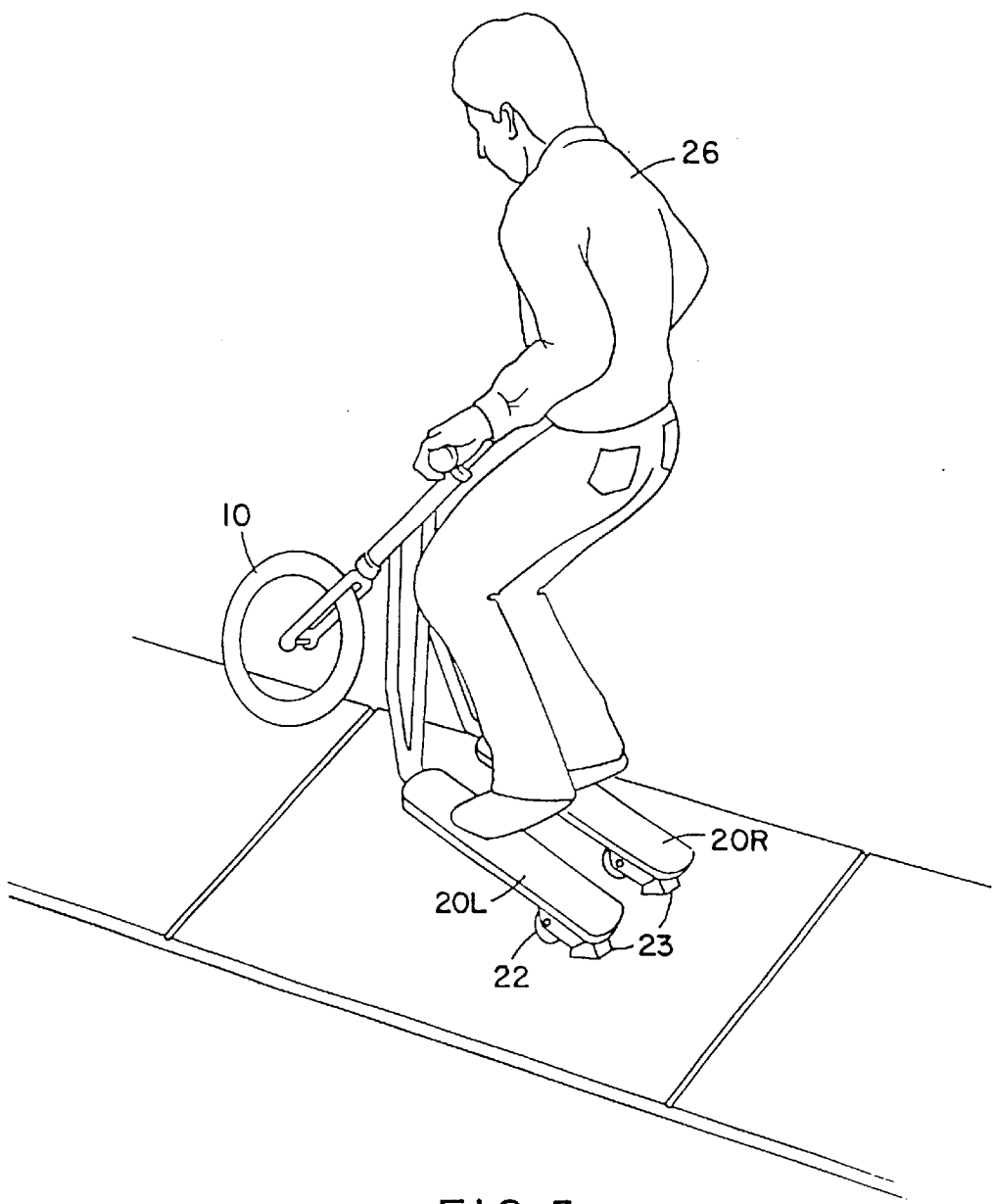
FIG. 4 shows a rider on the scooter when the scooter is upwardly tilted.

In the course of scooter travel, the scooter may be caused to jump, as when leaping over a step from a raised to a lower road surface, as shown in FIG. 4, which shows a rider (26) grasping the handle of the scooter. When the scooter jumps, footboards (20R and 20L) are then tilted upwardly and front wheel (10) is then raised above the road surface. As a consequence, the scooter now seeks to swing backward about rear skate wheels (22), particularly since the rider now leans backward.

Figure 5:
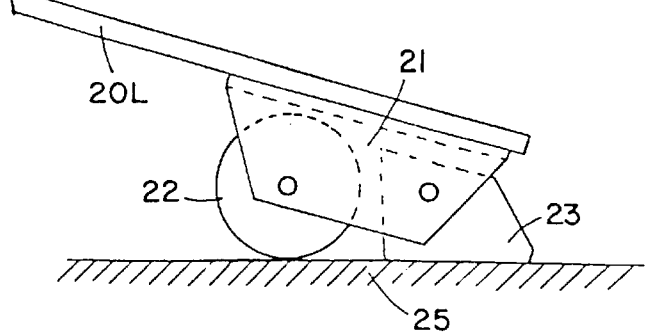
FIG. 5 illustrates the relation of a rear skate wheel to the ground when the footboard on which it is mounted is upwardly tilted.

However, the upward tilt of the footboards, as shown in FIG. 5, causes skid brakes (23) to engage and skid along ground surface (25) and thereby brake the scooter. This change in momentum also forces the scooter to swing forward, typically returning wheel (10) to the ground, restoring maximum stability.

Hence the rear skid brakes can improve safety by preventing the scooter from throwing off and possibly injuring the rider. In a vehicle in accordance with the invention, normal braking is effected by the front wheel brake, not by the rear skid brakes of the alternative embodiment described above.

Thus, depending upon the positioning the rear wheels, the skid brakes may not effect a braking action, rather they more commonly serve to return the front wheel to the ground surface. A scooter under the control of an experienced rider can be operated either without rear skid brakes and/or with the rear wheels positioned further forward on the rearwardly extending branch members, thereby allowing the rider to perform tricks such as wheelies and spins around the axis formed by either rear wheel. To facilitate the preference of an individual rider, who may at times utilize the scooter as a mode of transport and at other times utilize the same reconfigured scooter to perform tricks, an alternative embodiment provides a plurality of mounting positions on the underside of the rearwardly extending branch members, allowing for the rear wheel brackets (21) to be secured to different positions on the underside of its associated branch member. Importantly, each mounting position is configured to maintain the rear wheels in essentially parallel alignment.

Figure 6:
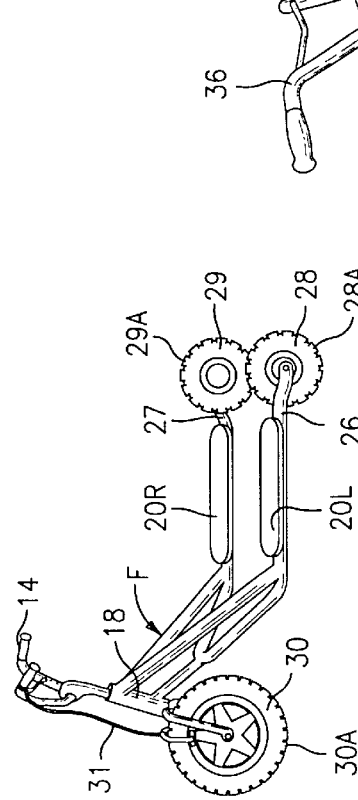
FIG. 6 shows a dual-footboard scooter for off-road use.

The dual-footboard scooter shown in FIG. 1 is an on-road scooter, meaning that its wheels function best on a paved road substantially devoid of surface imperfections and disruptions. But if the small diameter roller skate rear wheels or tired front wheel of this scooter encounter a deep rut or pothole in the paved road or sidewalk, the rider may lose control of the scooter. The off-road scooter shown in FIG. 6 is adapted to operate efficiently under difficult off-road conditions, as well as under normal on-road conditions. Thus the rider is not confined to a paved road or a sidewalk in good condition, but he may veer off onto an unpaved road, a dirt path or a grassy field.

The scooter shown in FIG. 6 has a bifurcated frame (F) extending from steering column (18), the frame having rearwardly extending branch members (26 and 27), shown supporting left and right footboards (20L and 20R). These branches extend beyond the footboard to terminate in smaller-diameter rear wheels (28 and 29), whose axles extend inwardly from the offset ends of the branches so that wheels are within these ends. Alternatively, rear wheels (28 and 29) can be outwardly positioned for even greater stability, with the rider able to select their arrangement on such outrigger structure.

A large-diameter front wheel (30) is coupled by a fork (as in FIG. 1) to a steering post extending through steering column (11) which is joined to handle bars (14). The rim of wheel (30) may further be engageable by a clamp-type brake controllable through a cable (31) by a lever mounted on the handlebar, as in FIG. 1. Where the off-road scooter shown in FIG. 6 differs from the on-road scooter illustrated in FIG. 1 in the material aspect that the wheels are provided with deep-tread tires which may be of solid or pneumatic construction formed of rubber or synthetic plastic material. Thus rear tires (28 and 29) are provided with deep-tread type tires (28A and 29A), while the larger diameter front wheel (30) may also be provided with a deep-tread tire (30A).

These deep-tread tires afford good traction under difficult off-road conditions so that the dual-footboard scooter can be used more adventurously by its rider, and the rider can veer off a paved road or sidewalk onto a dirt road or path, or a grassy field that a conventional scooter would have difficultly negotiating.

An alternative embodiment that further provides rear skid brakes also has a front wheel that engages the ground at the apex of an isosceles triangle having two equal sides, the rear wheels engaging the ground at the ends of the base of the triangle, with the stability of this scooter depending on the length of the triangle base, with a shorter base making a less stable scooter.

Figure 7:
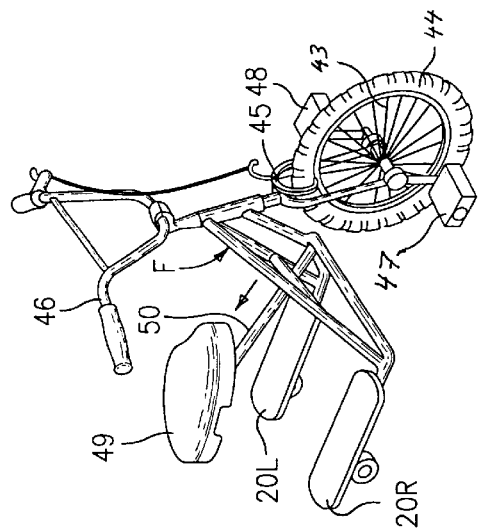
FIG. 7 shows an alternative embodiment of a dual footboard scooter for off-road use.

In order to enhance the stability of the scooter without significantly reducing its maneuverability, the off-road scooter shown in FIG. 7 is provided with a second type of outrigger for supporting rear wheels (32 and 33). The rear wheels are outwardly displaced and alongside footboards (20L and 20R). Although the base of the triangle is shorter than the previously described outrigger arrangement, this embodiment includes rear skid brakes (not shown), which improve scooter stability capable of efficient operation under all road conditions.

A still further alternative embodiment of the dual footboard ride-on vehicle allows for traveling or sliding over snow, an improvement over the use of a pair of skis or a ski bob, which is a vehicle for gliding downhill over snow. Such ski bob consists of two skis, one behind the other on a metal frame. Steering handle bars are connected to the forward ski, with a low seat attached to the longer rear ski for the rider who wears on his feet small skis for balance.

Figure 8:
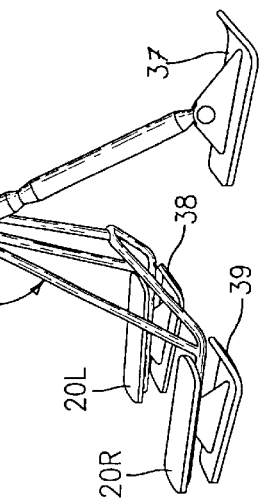
FIG. 8 shows a dual-footboard water scooter in accordance with the invention.

In the dual footboard snow scooter shown in FIG. 8, there is no need for the rider to wear small skis for balance, for the scooter which engages the snow surface with three skis in the configuration of a triangle is inherently balanced and stable.

The snow scooter is provided with a front ski (34) mounted at the end of a steering post extending through a steering column (35) to join handle bars (36). A bifurcated frame (F) defines rearwardly extending branches that support a pair of rear skis (37 and 38). Mounted above rear skis (37 and 38) are parallel footboards (20L and 20R), which may alternatively be part of the same assembly as the rearwardly extending branch member (not shown).

Thus on a level snow surface, the snow scooter shown in FIG. 8 may be pushed ahead by the rider who has one foot resting on a footboard and the other foot extending through the extended free space to make pushing contact with the snow on the ground surface to propel the scooter forward. Of course, for gliding downhill over snow, the rider may prefer to keep both feet on the footboards and simply steer downhill. In practice, the rear skis and the associated footboards may be hinged to the rearwardly extending branch members so that the rider standing on the footboard can angle the rear skis to slow the downhill slide of the snow scooter or to more effectively turn the snow scooter.

Figure 9:
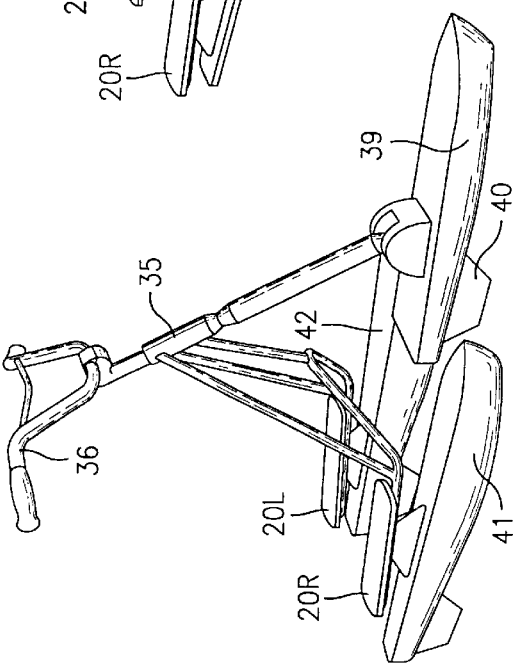
FIG. 9 shows a dual-footboard snow scooter in accordance with the invention.

This ride-on device can alternatively be configured to allow its rider to ride on water rather than on snow. The water scooter shown in FIG. 9 is essentially the same as the snow scooter shown in FIG. 8 except that instead of skis, the scooter is provided with a boat-shaped forward pontoon (39) having a rear fin (40), and a pair of boat-shaped rear pontoons (41 and 42), each provided with a rear fin. The fin (40) on forward pontoon (39) act as a rudder when this handlebar-controlled pontoon is steered by the rider.

The three pontoons which in practice may include inflatable bladders, has sufficient buoyancy to maintain afloat a child standing with both feet on the footboards (20R and 20L) mounted above the rear pontoons.

In order to operate this water scooter in the manner of a road scooter, the child wears flippers, and as he stands with one flippered foot on one footboard, he then uses his other flippered foot in the water space between the footboards to propel the scooter. Or the water scooter may be towed behind a motor boat in the manner of water skis.

A dual-footboard scooter in accordance with the invention is in a tricycle format in that it has a steerable front wheel and a pair of rear wheels. Of course, the scooter cannot function as a tricycle for it lacks pedals to turn the front wheel, and a seat on which the rider sits as he or she operates the pedals with his feet.

Figure 10:
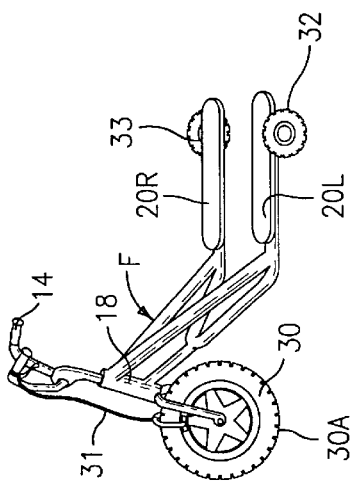
FIG. 10 shows a dual-footboard scooter that is convertible into a tricycle.

In the convertible dual-footboard scooter shown in FIG. 10 which is provided with a large diameter front wheel (43) which may have a deep-tread tire (44) and may also have a brake (45) operated by a lever on a handlebar (46), the front wheel is provided with a pair of detachable foot pedals (47 and 48). The coupling mechanism for attaching the pedals to the hub of the front wheel is preferably of the type which includes a pedal release button, making it easy to detach the pedals.

Also provided is a seat (49) mounted at the rear end of a strut (50) which is releasably coupled to the frame F of the vehicle, so that when not in use, the seat and strut therefor can be detached from the frame. When the pedals (47 and 48), the seat (49) and the strut (50) are decoupled from the vehicle, it then functions as a dual-footboard scooter in the manner described above.

Figure 11:
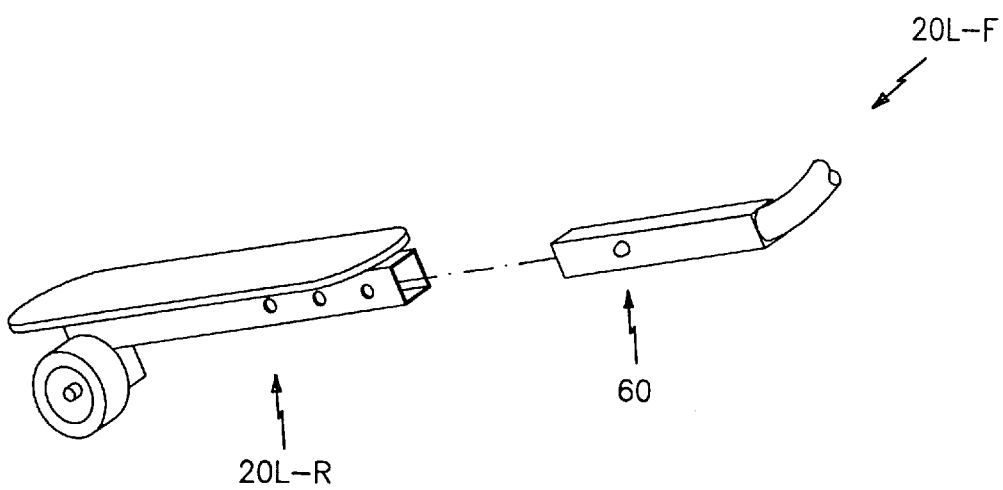
FIG. 11 is an illustration of a means for quick detachment of a rearwardly extending branch member.

It is common for people to use an automobile or other means to transport rider-propelled vehicle, such as the scooter of this invention, to a location where they prefer to obtain exercise. To allow owners of the dual-footboard scooter to transport their scooter in or on their automobile, on a bus, train or other vehicle a further embodiment of the invention, shown in FIG. 11, allows the dual-footboard scooter to be packed in as small or compact a space as possible. As shown in FIG. 11, the rearwardly extending branch member (20L-R) is attached to its associated bifurcated branch member (20L-F) via a quick detachment (60) that operates to allow the rearwardly extending branch member, which may support a rear wheel or may support or comprise a rear ski, depending upon the embodiment, to be easily removed, preferably without requiring the use of tools, while maintaining a secure connection between the rearwardly extending branch member (20L-R) when the scooter is in use. Such removal allows the scooter to be stored in a smaller volume of space while providing the required structural integrity when the rearwardly extending branch member is attached.

The mechanism for quick detachment can further allow, in another embodiment, the user to vary the distance between the front wheel and the rear wheels, thereby altering the maneuverability of the scooter. For example, the quick detachment (60) can alternatively align with any one of the three holes shown on the rearwardly extending branch member (20 L-R).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A ride-on scooter comprising:
    a front wheel having an axle coupled to a steering post passing through a steering column to join a steering handle;
    a rigid frame in tricycle format having bifurcated branch members permanently affixed to said steering column and extending rearwardly from said steering column;
    a first free space between said bifurcated branch members, extending horizontally between said bifurcated branch members and vertically from a road surface up to a bottom of the steering handle;
    said bifurcated branch members each attach to one of a pair of rearwardly extending branch members and each said rearwardly extending branch member supports one of a pair of rear wheels;
    a second free space between said pair of rearwardly extending branch members, extending horizontally between said rearwardly extending branch members and vertically from the road surface up to the bottom of the steering handle; and
    an extended free space defined by an uninterrupted combination of said first free space and said second free space; wherein
        said scooter is adapted to be propelled by a rider placing one foot on either rearwardly extending branch member and swinging an other foot through said extended free space and said other foot making pushing contact with the road surface across which the ride-on scooter is being propelled.

2. The scooter set forth in claim 1, further comprising a hand brake operatively coupled to said front wheel.

3. The scooter set forth in claim 1, further including a pair of footboards, with each footboard being supported by one of said rearwardly extending branch members.

4. The scooter set forth in claim 1, further comprising means for detaching each said rearwardly extending branch member from its associated bifurcated branch member.

5. The scooter set forth in claim 1, further comprising a quick detachment; wherein said quick detachment operates to disconnect each said rearwardly extending branch member from its associated bifurcated branch member.

6. The scooter set forth in claim 1, in which said front wheel includes an inflatable tire.

7. The scooter set forth in claim 6, in which said inflatable tire is a deep tread type tire.

8. The scooter set forth in claim 1, in which said pair of rear wheels are made up of a synthetic plastic material.

9. The scooter set forth in claim 1, in which each said rear wheel is attached to the rear end of each said rearwardly extending branch members.

10. The scooter set forth in claim 1, further including a rear skid brake behind each said rear wheel adapted to engage a road surface when said footboard is upwardly inclined.

11. A scooter as set forth in claim 10, in which said rear wheel and said skid brake are both supported on a bracket secured to said footboard.

12. A scooter as set forth in claim 10, in which said rear wheel and said skid brake are both supported on a bracket secured to said rearwardly extending branch member.

13. The scooter set forth in claim 1, further including an outrigger structure for attaching each said rear wheel to said scooter so that each said rear wheel is outwardly displaced from said footboard supported by said rearwardly extending branch member.

14. The scooter set forth in claim 1, further including a rearward outrigger structure for attaching said rear wheel at a rearward most point on said rearwardly extending branch member away from said front wheel.

15. The scooter set forth in claim 1, in which each said rear wheel is a roller skate wheel.

16. A scooter as set forth in claim 1, in which said rear end wheel is supported on a retractable axle to facilitate its replacement.

17. The scooter set forth in claim 1 further comprising a pair of brackets, wherein each said bracket supports one of said pair of rear wheels.

18. The scooter set forth in claim 17 wherein said pair of brackets may be adjustably positioned along the length of its associated said rearwardly extending branch member.

* * * * *